(12) United States Patent
Serobian

(10) Patent No.: US 7,645,333 B2
(45) Date of Patent: Jan. 12, 2010

(54) AQUEOUS COMPOSITION AND METHOD FOR IMPARTING RESISTANCE TO STAIN ABSORPTION

(75) Inventor: Ashot K. Serobian, Pleasanton, CA (US)

(73) Assignee: The Clorox Company, Oakland, CA (US)

(*) Notice: Subject to any disclaimer, the term of this patent is extended or adjusted under 35 U.S.C. 154(b) by 0 days.

(21) Appl. No.: 11/292,718

(22) Filed: Dec. 2, 2005

(65) Prior Publication Data

US 2007/0128962 A1 Jun. 7, 2007

(51) Int. Cl.
| | |
|---|---|
| C04B 41/50 | (2006.01) |
| C04B 41/49 | (2006.01) |
| C07F 7/18 | (2006.01) |
| C09D 183/04 | (2006.01) |
| C04B 28/36 | (2006.01) |
| C07D 295/18 | (2006.01) |
| C04B 14/00 | (2006.01) |
| C09D 5/20 | (2006.01) |
| C09K 3/00 | (2006.01) |
| C09K 3/18 | (2006.01) |
| C04B 7/00 | (2006.01) |
| C04B 7/34 | (2006.01) |
| C04B 28/00 | (2006.01) |
| C04B 32/00 | (2006.01) |
| C04B 14/48 | (2006.01) |
| C04B 16/00 | (2006.01) |
| C04B 22/04 | (2006.01) |

(52) U.S. Cl. .................. 106/287.1; 106/2; 106/34; 106/638; 106/642; 106/287.12; 106/287.13; 106/287.14; 106/287.16; 106/287.23; 106/401; 106/316

(58) Field of Classification Search .............. 106/287.1, 106/2, 34, 638, 642, 287.12, 287.13, 287.14, 106/287.16, 287.23, 401, 316
See application file for complete search history.

(56) References Cited

U.S. PATENT DOCUMENTS

| | | | |
|---|---|---|---|
| 3,449,289 A * | 6/1969 | Williams et al. | ............ 524/266 |
| 3,983,298 A | 9/1976 | Hahn et al. | |
| 5,741,439 A | 4/1998 | Armstrong et al. | |
| 5,759,980 A | 6/1998 | Russo et al. | |
| 6,090,767 A | 7/2000 | Jackson et al. | |
| 6,238,745 B1 | 5/2001 | Morita et al. | |
| 6,264,934 B1 * | 7/2001 | Kantner et al. | ........... 424/78.03 |
| 6,468,587 B2 | 10/2002 | Chang et al. | |
| 6,736,857 B2 | 5/2004 | Chang et al. | |
| 6,890,601 B2 | 5/2005 | Griswold et al. | |
| 6,900,166 B2 * | 5/2005 | Evers et al. | ................. 510/285 |
| 2004/0219373 A1 * | 11/2004 | Deruelle et al. | ............. 428/447 |

* cited by examiner

Primary Examiner—Jerry Lorengo
Assistant Examiner—James E McDonough
(74) Attorney, Agent, or Firm—Erin Collins

(57) ABSTRACT

The present invention relates to an aqueous based silicone protectant composition and method for treating various solid surfaces including, but not limited to, fiber-based products, leather, or other soft or hard surfaces to impart water and stain repellency. The protectant composition comprises an MQ resin, a polyorganosiloxane fluid, a silicone solvent and water. The aqueous silicone-based protectant composition is hydrophobic and substantially free of surfactants. The protectant composition can be applied directly or indirectly to a solid surface using various application devices including, but not limited to, spray, aerosol, wipes, sponges and pads.

16 Claims, No Drawings

AQUEOUS COMPOSITION AND METHOD FOR IMPARTING RESISTANCE TO STAIN ABSORPTION

FIELD OF THE INVENTION

The present invention relates to an aqueous-based, hydrophobic treatment composition and method for protecting surfaces from soils and stains. The hydrophobic treatment composition inhibits absorption of the stains and soils into a protected surface. The hydrophobic nature of the treated surface causes staining fluids and soils to bead up on the surface, which makes removal of stains and soils easy and effective.

BACKGROUND OF THE INVENTION

Within the sphere of the silicone water repellents used on fibers and fiber-based products, Japanese Published Patent Application Sho 51-9440 (9,440/1976) and Sho 53-4158 (4,158/1978) teach water repellent siliconee compositions with an aromatic or aliphatic hydrocarbon solvent and a curing catalyst. One of the drawbacks of these silicone water repellents is they must be cured at high temperatures before they are effective. The curing process increases production costs and does not allow consumers to apply the silicone water repellents to products of their choosing.

In other protective coatings, fluoropolymers are employed for their ability to impart water repellency and stain resistance to solids. These fluoropolymers are the polymers of a perfluoro group-functional or fluoroalkyl-functional polymerizable monomer or the copolymer of such a monomer with another polymerizable monomer. One of the problems with fluoropolymers is that they are insoluble in low-toxicity alcohols such as ethanol, and the organic solvent used to dissolve the fluoropolymers must therefore be selected from among solvents such as ketones, e.g., acetone or methyl ethyl ketone, esters such as ethyl acetate, aliphatic hydrocarbons such as n-hexane and n-heptane, aromatic hydrocarbons such as toluene and xylene, and chlorinated hydrocarbons such as 1,1,1-trichloroethane and trichloroethylene.

Unfortunately, almost of these solvents are not compatible with propellant gases or they are not readily absorbed into the solid surface being treated. In practice, only 1,1,1-trichloroethane is commonly used as a solvent for fluoropolymers in surface protectant compositions. The use of 1,1,1-trichloroethane is closely regulated because of environmental concerns regarding its potentially harmful impact on the ozone layer. Although researchers are trying to find other suitable solvents for flurorpolymers, which would be environmentally friendly, no viable alternatives are presently available.

Furthermore, when treating a solid such as a fiber-based product, leather, or other soft surfaces to impart water repellency thereto, the consuming public desires spray formulations to facilitate the application process and that are both easy to use and safe both to consumers and the environment. In addition, consumers also want spray-formulated water repellents that do not have an unpleasant odor is caused by high levels of solvents. Therefore, the use of high levels of volatile organic compound (VOC) solvents, commonly found in silicone-based protectants, is undesirable for both consumer and environmental safety.

There exists a strong consumer need for an aqueous, silicone-based protectant compositions with low levels of solvent or VOC exempt solvents which are effective in protecting surfaces from stains and soils and can be applied to surfaces by consumers.

SUMMARY OF THE INVENTION

The present invention relates to an aqueous silicone-based protectant composition and method for treating various solid surfaces including, but not limited to, fiber-based products, leather, or other soft or hard surfaces to impart water and stain repellency. The protectant composition comprises an MQ resin, a polyorganosiloxane fluid, a silicone solvent and water. The aqueous, silicone-based protectant composition is hydrophobic and substantially free of surfactants. The aqueous, silicone-based protectant is preferably a gel product with a neat viscosity of about 700 to 20,000 cP, most preferably from 1,000 to 10,000 cP, that is stable for at least six months.

The protectant composition can be applied directly or indirectly to a solid surface using various application devices including, but not limited to, spray, aerosol, wipes, sponges and pads. When the protectant composition is applied using an aerosol application, the aerosol propellant substantially evaporates prior to reaching the surface of the substrate being treated. Once the protectant composition is applied to a surface, the treated surface will be effective at repelling water and stains for at least four weeks. The protectant composition is ideal for a variety of surfaces because it leaves no visible film on the surface, which is treated with the composition, and the composition does not substantially alter the feel or texture of the treated surface.

DETAILED DESCRIPTION OF THE INVENTION

Before describing the present invention in detail, it is to be understood that this invention is not limited to particularly exemplified systems or process parameters as such may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

As used herein, the term "treated surface" is intended to include a substrate or surface to which the aqueous, silicone-based protectant composition has previously been applied. Examples of treated surfaces may include, but are not limited to leather, carpet, upholstery and any other material that is readily exposed to water or staining fluids.

As used herein, "MQ resin" is a silanol-functional silicone resin. MQ resins are generically known in the art and contain M units, represented by the formula $R^1{}_3SiO_{1/2}$ and Q units, represented by the formula $SiO_{4/2}$. It is recognized that while the MQ resins are primarily made from M and Q units, there can be up to 5 mole percent of D units represented by the formula $R^2{}_2SiO_{2/2}$ and T units, represent by the formula $R^3SiO_{3/2}$, wherein each $R^1$, $R^2$ and $R^3$ is independently hydroxyl or a monovalent hydrocarbon radical. Non-limiting examples of preferred monovalent hydrocarbon radical include those monovalent hydrocarbon radicals having from about 1 to about 6 carbon atoms, such as alkyl radicals including methyl, ethyl, and isopropyl; alkenyl radicals including ethylene, propenyl, and hexenyl; cycloaliphatic radicals such as cyclopentyl cyclohexenyl; olefinic-containing radicals such as vinyl and allyl; and olefinic-containing radicals. Preferably, the monovalent hydrocarbon radical is methyl.

As used herein, "VOC-exempt solvents" refers to volatile organic compounds which have been explicitly stated to be exempt from EPA regulations under 40 C.F.R. 51.100(s). The EPA regulations include a list of compounds that are explicitly exempted from regulation as VOCs, even though they are "compounds of carbon." These include a short list of compounds such as carbon monoxide and carbon dioxide that historically have not been regulated as VOCs, and a longer list of compounds that EPA has classified as "negligibly reactive." Negligibly reactive compounds are compounds that, based on scientific studies, have been found "not to contribute appreciably to ozone formation." This list of compounds (often referred to as "VOC-exempt compounds") is established and modified by regulation. The list of exempt compounds is found at 40 C.F.R. 51.100(s).

The aqueous, silicone-based protectant composition of the present invention comprises a silicone resin, a polyorganosiloxane, a VOC exempt solvent, and water. A preferred embodiment of the protectant composition comprises 0.1-5% by weight of silicone resin, 0.2-10% by weight of polyorganosiloxane, 1-18% by weight VOC exempt solvent and greater than 60% by weight water.

The aqueous, silicone-based protectant composition contains 0.1-5% by weight of silicone resin which interacts with the polyorganosiloxane and water to form a gel. The gel is an aqueous water-in-oil emulsion type gel with a neat viscosity of about 700 to 20,000 cP. The preferred viscosity range of 1,000 to 10,000 cP allows the gel to remain stable without separation for the period of at least six months. The gel will eventually separate over time but can easily be put back into solution by agitation, mixing, stirring, shaking, or other similar means, the composition in a suitable container.

The silicone resin is preferably a silanol-functional resin. Most preferably the silicone resin is an MQ resin, which by definition contains M units, represented by the formula $R^1_3SiO_{1/2}$ and Q units, represented by the formula $SiO_{4/2}$. Many commercial MQ resins have molecular weights between 2000 and 10,000 and are available through Dow Corning, Dupont and other similar suppliers. The MQ resins have M:Q ratios varying from about 1:1 to 0.6:1 and hydroxyl contents from about 0% to 3%. By way of example and not by way of limitation, the silicone resin may be a trimethylsilicate resin containing a reactive silanol group (—SiOH) that demonstrates increased substantivity to the surfaces. The hydroxy groups of the trimethylsilicate resin will bond with the substrate and itself to produce a hydrophobic treatment that inhibits water absorption into the substrate. Treated surfaces are hydrophobic while maintaining their original appearance and texture.

A high level of hydrophobicity on surfaces can be achieved by efficient deposition of a silanol-functional MQ resin onto the surface in an aqueous-based gel form. The hydrophobicity of the treated surfaces was proven by observing water, coffee, and other staining fluids bead up on the surface of carpet, upholstery and other surfaces that are prone to staining. Once the fluids bead up on the surface of the treated article they can be easily removed by wiping up the fluid with an absorbent article such as a towel, a cloth, a sponge, a tissue, etc. The treated surfaces remained hydrophobic for at least one month or more. Even after one month treated surfaces continued to show a decreased rate of absorption for fluids in comparison to un-treated surfaces.

In contrast to traditional aqueous based gels and emulsions, the protectant composition contains no surfactants. The invention contains no emulsifying agent or surfactant to eliminate surfactant deposition on surfaces. The composition is essentially free of surfactant therefore the composition does not leave a visible film or residue on the treated surface and does not alter the texture and feel of the treated surface. In addition, the elimination of surfactants makes it easier to create a high level of hydrophobicity on treated surfaces. Even low levels of surfactant deposition on surfaces after application can cause hydrophobic agent to be washed away upon future contact with water or other fluids.

Unlike other aqueous based gels and emulsions, the protectant composition contains little or no amounts of swellable, hydrophobically modified polymers. The protectant composition may contain about 0.02-0.07% swellable, hydrophobicly modified polymers to maximize the stability of MQ resin after deposition onto surfaces. The addition of swellable, hydrophobically modified polymers to the protectant composition enables the protectant to maintain phase stability for twelve months or more. The hydrophobically modified polymers can be prepared by processes known in the art such as disclosed in U.S. Pat. Nos. 5,147,576, and 5,650,473, incorporated herein by reference.

The hydrophobically modified polymers have a hydrophilic backbone and at least one hydrophobic moiety. The hydrophilic backbone may be linear or branched and may be prepared from at least one ethylenically unsaturated hydrophilic monomer selected from unsaturated acids preferably $C_1$-$C_6$ acids, amides, ethers, alcohols, aldehydes, anhydrides, ketones and esters; polymerizable hydrophilic cyclic monomers; and non-ethylenically unsaturated polymerizable hydrophilic monomers selected from glycerol and other polyhydric alcohols. Combinations of hydrophilic monomers may also be used which are sufficiently water soluble to form 1% by weight solution in water. Other suitable examples of swellable, hydrophobically modified polymers include hydrophoblically modified acrylic polymers sold by Rohm and Haas and Carbopol® 649, Carbopol® 4691, Carbopol® 2623, Carbopol® EZ2 and Carbopol® EZ3 sold by Noveon.

The polyorganosiloxane component is used along with the MQ resin to impart water repellency and staining resistance to treated surfaces. One or more polyorganosiloxane fluids can be used in the composition which in total comprise about 0.2-10% by weight of the composition and individually have a neat viscosity of about 50 cst to about 10,000 cst. The polyorganosiloxane fluids can have an arbitrary structure, for example, linear, branched, network or cyclic structure. Non-limiting examples of the organo groups include hydrogen atoms, alkyl groups, alkenyl groups, aryl groups, a methyl groups, an ethyl groups, a propyl groups, a butyl groups, a hexyl groups, an allyl groups and a phenyl groups. Among these organo groups, methyl, vinyl and phenyl-groups are advantageous in practice, since they are produced on an industrial scale and are less expensive.

It is preferred that the polyorganosiloxane component of the composition is preferably polydimethylsiloxane (PDMS), which is the most widely used silicone-based organic polymer, and is particularly known for its unusual rheological properties. It is optically clear, and is generally considered to be inert, non-toxic and non-flammable. PDMS has been assigned CAS number 63148-62-9, and is occasionally called dimethicone. PDMS is one of several types of silicone oil.

The VOC-exempt solvent has a neat viscosity of about 1.5 cst to about 5 cst. the VOC-exempt solvent preferably comprises linear or cyclic silicones. By way of example and not by way of limitation, the VOC-exempt solvent may be a volatile methylsiloxane (VMS) fluid such as OS-2 silicone solvent® created by Dow Corning which is safe for a wide range of materials. Most preferably, the VOC-exempt silicone solvent has a low molecular weight of less than 1000 g/mol. Other suitable VOC-exempt compounds may be found at 40 C.F.R. 51.100(s).

Unlike other commercially available silicone carpet and upholstery protectant compositions, the inventive protectant composition is water-based. Conventional silicone-based protectant compositions contain large amounts of organic solvents, which present a health hazard and are harmful to the environment. Since organic solvents can be harmful to humans to inhale, it is beneficial to have aqueous, silicone-based protectant composition particularly for small, enclosed spaces or spaces without good ventilation such as the interiors of cars, boats, basements, etc. In a preferred embodiment of the invention, the protectant composition contains greater than 60% by weight of water. Most preferably, the protectant composition contains greater than 70% by weight of water. The pH of the protectant composition should be from about 6 to 8. An aqueous, silicone-based protectant composition with a substantially neutral pH is advantageous because it may be used on a wide range of materials including upholstery, fabrics, nonwoven materials, leather, carpet, etc. without staining or discoloring the treated surface.

The protectant composition may additionally contain optional adjuncts, including but not limited to, fragrances or perfumes, pH adjusting agents, stabilizers, thickeners, defoamers, swellable polymers, preservatives, propellants, buffers, alumina, clays, silica and abrasive materials.

The protectant composition may be applied to a surface by any practical means, including but not limited to, wipes, pads, sponge, soaking, spraying and coating. In a preferred embodiment of the invention, the protectant composition is a sprayable gel or an aerosol spray with approximately 10% by weight propellant in the composition. Once the protectant composition has been applied to the surface of an article it may be allowed to dry by letting the water evaporate or may be manually dried by any suitable means. Once the protectant composition is dry on a surface, it forms a resulting protective coating on the surface, which is essentially free of solvent. The protectant composition is essentially free of solvents because the VOC-exempt silicone solvent is less than 20% by weight of the composition and quickly evaporates after contact with a surface being treated.

The system and method for applying the protectant composition to a surface involves, applying the composition to a surface allowing the treated surface to dry. Once the protectant composition is applied to a substrate surface, the treated surface becomes hydrophobic causing staining fluids to bead up on the surface of the substrate. An absorbent article may be used to absorb the beaded staining fluids prior to absorption into the surface of the substrate. The absorbent article may be a wide variety of materials including but not limited to sponges, towels, paper materials, tissues, and any other suitable materials.

EXPERIMENTAL

Several specific, non-limiting, examples of the protectant composition in weight percent are as follows. The Example composition was prepared as a sprayable gel and the Example 2 composition was prepared as an aerosol spray. The example compositions, described below, are intended to illustrate the sample compositions that were used to acquire experimental data on the efficacy of the protectant compositions. As detailed above, the example formulas below can contain other optional adjuncts, and the protectant compositions may be applied to a surface by other suitable means than spray or aerosol applications.

EXAMPLE 1

| Ingredient Detail | Percentage by Weight of Active |
|---|---|
| DC-749 ® blend (by Dow Corning) (MQ resin and DC-245 ® cyclic silicone solvent) | 2.5 |
| DC-1912 ® blend (by Dow Corning) (MQ resin and DC-200 ® fluid, 100 cst) | 0.5 |
| DC-200 ®, 350 cst (silicone PDMS fluid) | 2.5 |
| Dow Corning OS-2 Fluid ® (completely VOC-exempt linear silicone solvent) | 15.0 |
| Water | 79.5 |

EXAMPLE 2

| Ingredient Detail | Percentage by Weight of Active |
|---|---|
| DC-749 blend (by Dow Corning) (MQ resin and DC-245 cyclic siliconee solvent) | 2.5 |
| DC-1912 blend (by Dow Corning) (MQ resin and DC-200 fluid, 100 cst) | 0.5 |
| DC-200, 350 cst (siliconee PDMS fluid) | 2.5 |
| Dow Corning OS-2 Fluid (completely VOC-exempt linear siliconee solvent) | 15.0 |
| Bioban 1246 (preservative) | 0.15 |
| Water | 69.35 |
| Propellant | 10.0 |

A test was performed on a series of carpet swatches where one half of each of the carpet swatches was sprayed with the protectant formula of Example 1 the other half of the same carpet swatches was treated with Scotchgard™ Carpet Protector by 3M, for comparison purposes. After all the carpet swatches were sprayed with both protectant compositions they were allowed to dry for approximately 24 hours. Once the carpet swatches were dry, water was applied to each of the treated areas on the carpet swatches using a dropper. The water beaded up and was not absorbed on each of the carpet swatches that was treated with either the Example 1 formula of the present invention or the Scotchgard™ Carpet Protector. In addition, the water remained on the surface of each of the treated carpet surfaces for at least 24 hours before it finally evaporated and disappeared. The same test was repeated on the carpet swatches, but this time cold solutions of coffee and tea were applied to the treated carpet swatches. The results were the same as that of the water tests and the cold coffee and tea solutions beaded up on the surface of each of the treated carpets for at least 24 hours before the beads of fluid evaporated. Even after the solutions of coffee and tea dried, the staining residue from the coffee and the tea remained on the surface of the carpet fibers rather than being absorbed down the length of the fibers. The fact that the staining residue remained on the carpet surface indicates that the solutions were actually evaporating rather than being absorbed down into the carpet fibers.

A second set of tests was performed using the same type of carpet swatches and the same cold liquid samples of water, coffee and tea. In this set of tests, portions of the carpet swatches were treated with the Example 1 formula and the Scotchgard™ Carpet Protector. After the carpet swatches were treated with the Example 1 formula and the Scotchgard™ Carpet Protector the swatches were immediately manually dried using an absorbent towel. After the swatches were manually dried, the cold liquid samples of water, coffee and tea were applied to the treated surfaces using a dropper.

The carpet swatches treated with Example 1 formula were effective and the cold solutions of coffee, water and tea beaded up on the surface for at least 24 hours before finally evaporating. In addition, the staining residue from the coffee and tea solutions remained on the surface of the carpet fibers treated with the Example 1 formula. Conversely, the carpet swatches treated with Scotchgard™ Carpet Protector were not effective and the cold solutions of coffee, water and tea were all quickly absorbed into the fibers of the carpet swatches. Additionally, the staining residues from the coffee and tea samples were absorbed down into the carpet fibers treated with Scotchgard™ Carpet Protector.

A third set of tests using hot solutions of water, coffee and tea was performed on carpet swatches to compare the performance of the Example 1 formula against the Scotchgard™ Carpet Protector. The areas of the carpet swatches treated with the Example 1 formula of the present invention were able to repel the hot coffee, tea and water samples in the same manner that they had repelled the cold samples. The liquid beaded up on the surface and was not absorbed into the carpet fibers of the areas of the swatches that were treated with the Example 1 formula. On the other hand, the areas of the carpet swatches treated with Scotchgard™ Carpet Protector showed some initial resistance to the hot samples of water, coffee and tea because initially the liquid beaded up on the surface, but within less than 5 minutes the hot samples penetrated the surface and were absorbed into the carpet.

Additional absorption testing was performed on a carpet swatch treated with the Example 1 formula to see how long the protective composition remained effective. The treated carpet sample was tested daily with hot and cold solutions of water for the period of one month. At the end of one month, there was no noticeable difference in the hydrophobicity of the surfaces water continued to bead up on the surface and remain on the surface for a period of at least 24 hours.

A test was also performed to determine if surface abrasion would negatively affect the hydrophobicity of surfaces treated with the Example 1 formula. A treated carpet swatch was prepared an allowed to dry and then a swatch of fabric was repeatedly rubbed up and down over the surface of the carpet for 500 cycles. A cycle is one time up and down the length of the surface of the carpet. Then the treated carpet sample was tested with hot and cold samples of water, coffee and tea. The treated carpet swatch remained hydrophobic and all of the fluid samples beaded up on the surface of the carpet for a period of at least 24 hours.

The invention has been described with reference to a preferred embodiment and alternates thereof. It is believed that many modifications and alterations to the embodiments disclosed will readily suggest itself to those skilled in the art upon reading and understanding the detailed description of the invention. It is intended to include all such modifications and alterations insofar as they come within the scope of the present invention.

What is claimed is:

1. An aqueous composition consisting of:
   a. an MQ resin;
   b. a polydimethylsiloxane fluid;
   c. a VOC exempt silicone solvent;
   d. water; and
   e. optionally, an adjunct selected from the group consisting of: fragrances, dyes, swellable polymers, abrasives, aerosol propellants, and combinations thereof;
   wherein the aqueous composition forms an aqueous water-in-oil gel.

2. The aqueous composition of claim 1, wherein the viscosity of the composition ranges from about 1,000 to 10,000 cP at 25° C.

3. The aqueous composition of claim 1, wherein the composition comprises about 0.1 to 5% by weight of MQ resin.

4. The aqueous composition of claim 1, wherein the composition comprises about 0.2 to 10% by weight of polydimethylsiloxane fluid.

5. The aqueous composition of claim 1, wherein the composition comprises about 1 to 18% by weight of a VOC exempt silicone solvent.

6. The aqueous composition of claim 1, wherein the composition comprises an adjunct which less than 1% by weight of swellable hydrophobically modified polymers.

7. The aqueous composition of claim 1, wherein the pH of the composition ranges from about 6 to 8.

8. The aqueous composition of claim 1, wherein the VOC exempt silicone solvent comprises a volatile methylsiloxane fluid.

9. The aqueous composition of claim 1, wherein the MQ resin is a trimethylsilicate resin containing a silanol group.

10. An upholstery and carpet treating composition consisting of: an aqueous emulsion of a silanol-functional MQ resin, a polydimethylsiloxane fluid, and water.

11. The aqueous composition of claim 10, wherein the viscosity of the composition ranges from about 1,000 to 10,000 cP at 25° C.

12. The aqueous composition of claim 10, wherein the composition comprises about 0.1 to 5% by weight of the silanol-functional MQ resin.

13. The aqueous composition of claim 10, wherein the composition further comprises about 0.2 to 10% by weight of polydimethylsiloxane fluid.

14. The aqueous composition of claim 10, wherein the pH of the composition ranges from about 6 to 8.

15. An aqueous composition consisting of:
   a. about 0.1-5% by weight of one or more silanol-functional MQ resins;
   b. about 0.2-10% by weight of one or more polydimethylsiloxane fluids;
   c. about 1-18% by weight of one or more volatile methylsiloxane VOC-exempt solvents; and
   d. at least 70% by weight of water.

16. A method for protecting surfaces comprising the steps of:
   a. treating a surface with a protective composition consisting:
      i. one or more MQ resins;
      ii. one or more polyorganosiloxane fluids;
      iii. one or more VOC exempt silicone solvents; and
      iv. water
   b. allowing the water in the protective composition to evaporate or manually drying the surface treated with the protective composition; and
   c. forming a resulting protective coating on the surface which is essentially free of solvent.

* * * * *